United States Patent
Lee et al.

(10) Patent No.: US 10,277,392 B2
(45) Date of Patent: Apr. 30, 2019

(54) CRACKING DEVICES AND METHODS THEREOF

(71) Applicant: Winbond Electronics Corp., Taichung (TW)

(72) Inventors: Sung-Shine Lee, Hsinchu County (TW); Szu-Chi Chung, Hualien County (TW); Chun-Yuan Yu, Taoyuan (TW); Hsi-Chia Chang, Hsinchu (TW); Chen-Yi Lee, Hsinchu (TW)

(73) Assignee: WINBOND ELECTRONICS CORP., Taichung (TW)

( * ) Notice: Subject to any disclaimer, the term of this patent is extended or adjusted under 35 U.S.C. 154(b) by 209 days.

(21) Appl. No.: 15/598,053

(22) Filed: May 17, 2017

(65) Prior Publication Data
US 2017/0353295 A1  Dec. 7, 2017

(30) Foreign Application Priority Data
Jun. 3, 2016  (CN) .......................... 2016 1 0389877

(51) Int. Cl.
*H04L 9/00* (2006.01)
*G06F 17/50* (2006.01)
*H04L 9/08* (2006.01)

(52) U.S. Cl.
CPC .......... *H04L 9/002* (2013.01); *G06F 17/5009* (2013.01); *H04L 9/085* (2013.01);
(Continued)

(58) Field of Classification Search
CPC ....... H04L 9/002; H04L 9/085; H04L 9/0861; H04L 2209/80; G06F 17/5009; G06F 2217/16
See application file for complete search history.

(56) References Cited

U.S. PATENT DOCUMENTS 7,599,488 B2 * 10/2009 Kocher ................ G06F 7/00
380/1
2011/0268266 A1 * 11/2011 Fujisaki .................. H04L 9/003
380/28
(Continued)

FOREIGN PATENT DOCUMENTS

CN          104811295 A       7/2015

OTHER PUBLICATIONS

Paul Kocher et al.; "Differential Power Analysis"; CRYPTO'99, LNCS 1666, 1999, pp. 388-397.
(Continued)

*Primary Examiner* — Jason K Gee
*Assistant Examiner* — Abdullah Almamun
(74) *Attorney, Agent, or Firm* — Muncy, Geissler, Olds & Lowe, P.C.

(57) ABSTRACT

A cracking method for cracking a secret key of an encrypting device includes: building up a leakage model for the encrypting device; performing a mathematical calculation on the leakage model, according to a plurality of sets of input data, to generate a mathematical model; generating a plurality of sets of hypothesized keys; generating a plurality of sets of simulation data corresponding to the hypothesized keys using the mathematical model; providing the input data for the encrypting device and detecting a plurality of sets of leakage data generated by the encrypting device; performing the mathematical calculation on the leakage data to generate calculated data; determining a correlation between each of the simulation data and the calculated data; and determining one of the hypothesized keys to be consistent with the secret key according to the correlation.

12 Claims, 3 Drawing Sheets

(52) U.S. Cl.
CPC ........ *H04L 9/0861* (2013.01); *G06F 2217/16* (2013.01); *H04L 2209/80* (2013.01)

(56) References Cited

U.S. PATENT DOCUMENTS

2016/0140274 A1\* 5/2016 Wachs .................... G06F 17/50
                                                                703/2
2016/0140340 A1\* 5/2016 Walters ................ G06F 21/556
                                                                726/22
2018/0365195 A1\* 12/2018 Rioul ...................... G06F 17/18

OTHER PUBLICATIONS

Eric Brier et al.; "Correlation Power Analysis with a Leakage Model"; 2004; pp. 1-14; Gemplus Card International, France.
S'Ebastien Aumonier; "Generalized Correlation Power Analysis"; Sep. 2007; pp. 1-11; Oberthur Card Systems SA.

\* cited by examiner

CRACKING DEVICES AND METHODS THEREOF

CROSS REFERENCE TO RELATED APPLICATIONS

This Application claims priority of China Patent Application No. 201610389877.3, filed on Jun. 3, 2016, the entirety of which is incorporated by reference herein.

BACKGROUND OF THE INVENTION

Field of the Invention

The disclosure relates generally to cracking devices and methods for side-channel attacks, and more particularly relates to cracking devices and methods configured to perform a calculation on a leakage model of correlation power analysis for improving cracking efficiency.

Description of the Related Art

Since IOT devices are mostly unattended so as to be a great attacking target for hackers, the importance of physical security of IOT devices grows. Side-Channel Attacks (SCAs) utilize a device's physical properties such as power, electromagnetic waves, temperature, etc. to reveal the secret key and information of the targeted device. Research from side-channel attacks reveals the potential weaknesses of devices and hence makes designers aware of possible security breaches. In order to ensure the security of devices, designers have to take side-channel attacks into consideration in the design process, and test the designed IOT device using every kind of side-channel attack technique.

In order to shorten the cracking time of a side-channel attack, it is necessary to lower the measurement noise and algorithm noise for reducing the quantity of data that should be processed and the complexity of data, so as to improve the cracking efficiency.

BRIEF SUMMARY OF THE INVENTION

In an embodiment, a cracking method for cracking a secret key of an encrypting device comprises: building up a leakage model for the encrypting device; performing a mathematical calculation on the leakage model, according to a plurality of sets of input data, to generate a mathematical model; generating a plurality of sets of hypothesized keys; generating a plurality of sets of simulation data corresponding to the hypothesized keys using the mathematical model; providing the input data for the encrypting device and detecting a plurality of sets of leakage data generated by the encrypting device; performing the mathematical calculation on the leakage data to generate calculated data; determining a correlation between each of the simulation data and the calculated data; and determining one of the hypothesized keys to be consistent with the secret key according to the correlation.

In an embodiment, a cracking device for cracking a secret key of an encrypting device comprises: a controller; and a non-volatile storage device. The non-volatile storage device is configured to store a plurality of instructions. The controller executes the respective steps according to the instructions. The steps comprise: building up a leakage model for the encrypting device; performing a mathematical calculation on the leakage model, according to a plurality of sets of input data, to generate a mathematical model; generating a plurality of sets of hypothesized keys; generating a plurality of sets of simulation data corresponding to the hypothesized keys using the mathematical model; providing the input data for the encrypting device and detecting a plurality of sets of leakage data generated by the encrypting device; performing the mathematical calculation on the leakage data to generate calculated data; and determining one of the hypothesized keys to be consistent with the secret key according to a correlation between each of the simulation data and the calculated data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
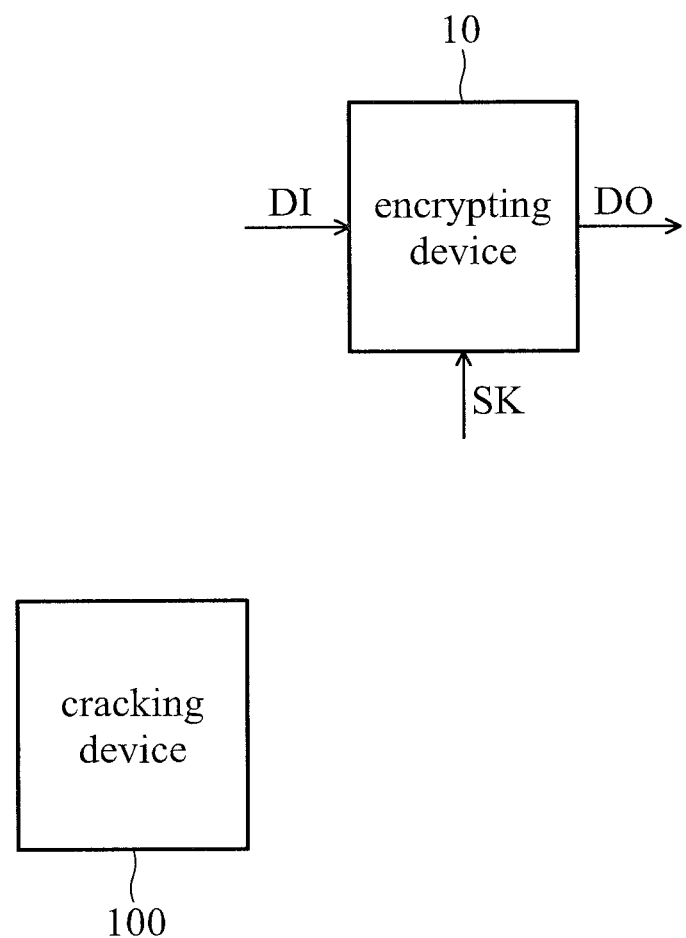
FIG. 1 is a schematic diagram of a cracking device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a schematic diagram of a cracking device in accordance with an embodiment of the invention. As shown in FIG. 1, the encrypting device 10 is configured to encrypt the input data DI according to the secret key SK and to generate the leakage data DO in the encrypting process. According to an embodiment of the invention, the leakage data DO may be timing information, an alarm, an indicating light, power consumption, leaked electromagnetic waves, etc. The cracking device 100 cracks the secret key SK of the encrypting device 10 according to a cracking method which will be described in detail in the following paragraphs.

Figure 2:
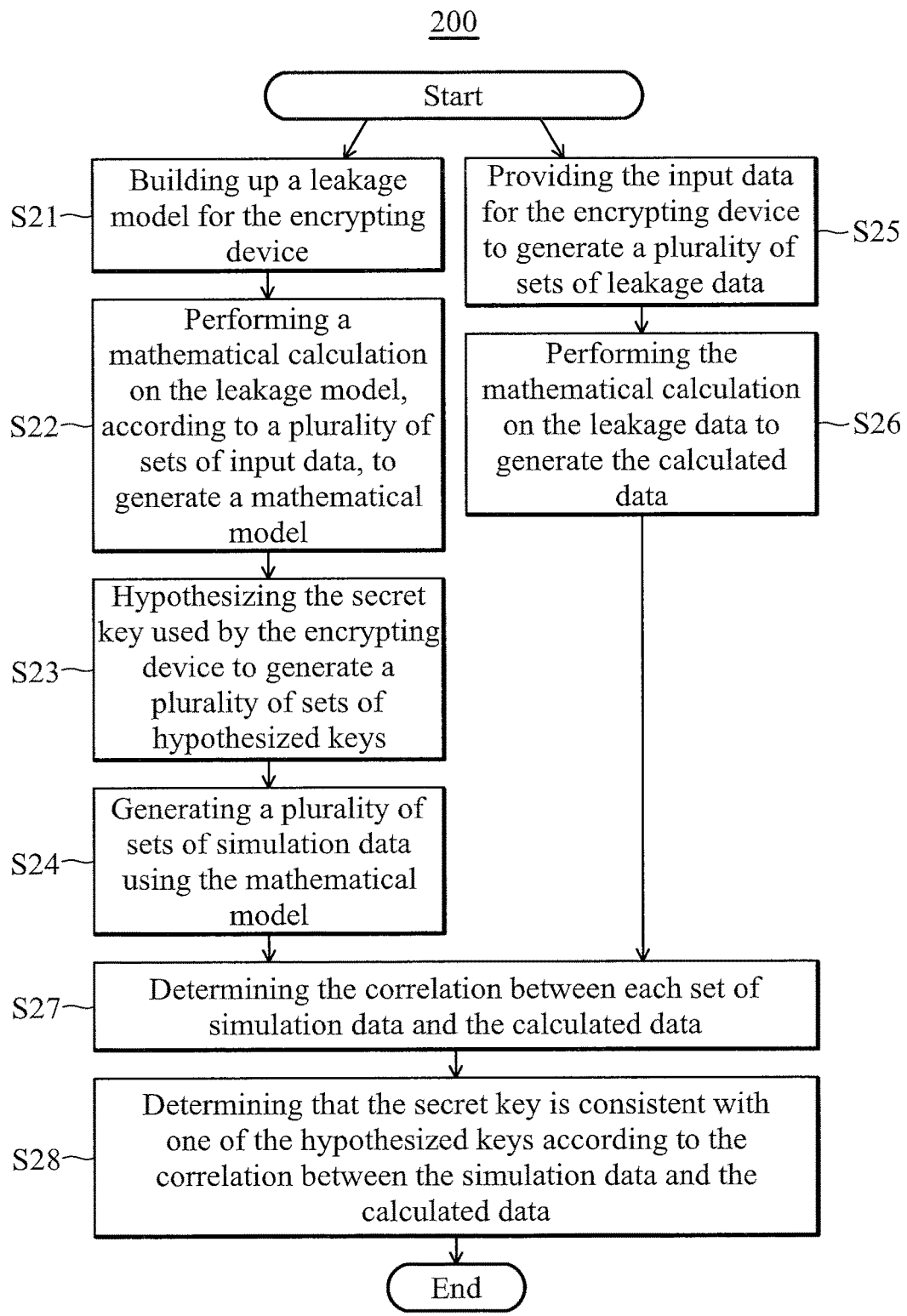
FIG. 2 is a flow chart of a cracking method in accordance with an embodiment of the invention.

FIG. 2 is a flow chart of a cracking method in accordance with an embodiment of the invention. For the sake of} explaining the invention in detail, the explanation of FIG. 2 will be accompanied with FIG. 1. As shown in FIG. 1, the cracking device 100 builds up a leakage model for the encrypting device 10 (Step S21).

According to an embodiment of the invention, the leakage model is a function of the leakage data DO generated by the encrypting device 10 based on the input data DI and the secret key SK. That is, the leakage model generates the different leakage data DO with a first variable related to only the input data DI, a second variable related to only the secret key SK, and a third variable related to both the input data DI and the secret key SK.

In order to lower the algorithm noise, the cracking device 100 performs a mathematical calculation on the leakage model, according to a plurality of sets of input data DI, to generate a mathematical model (Step S22), for eliminating the second variable only related to the secret key SK. According to an embodiment of the invention, the simplest mathematical calculation is to perform a calculation of addition or subtraction on the leakage model, based on a plurality of sets of input data DI, to generate the mathematical model.

Then, the cracking device 100 hypothesizes the secret key SK used by the encrypting device 10 to generate a plurality of sets of hypothesized keys (Step S23). According to an embodiment of the invention, the secret key SK may be a 128-bit key. According to an embodiment of the invention, the cracking device 100 divides the secret key SK into several parts and hypothesizes each part of the secret key SK to generate a plurality of sets of hypothesized keys. It is illustrated that each part of the secret key SK includes 8 bits. The cracking device 100 hypothesizes 8 bits of the secret key SK to generate $2^8$ sets of hypothesized keys. Compared to hypothesizing the 128-bit secret key SK to generate $2^{128}$ sets of hypothesized keys in an exhaustive search, the cracking device 100 provided herein can greatly reduce the number of hypothesized keys that are necessary, so that the cracking efficiency should be greatly improved.

The cracking device 100 further inputs the plurality of sets of hypothesized keys to the mathematical model to generate a plurality of sets of simulation data (Step S24). Since the influence of the second variable related to only the secret key SK has been removed from the mathematical model using the mathematical calculation, the plurality of sets of simulation data are merely related to the first variable and the third variable.

On the other hand, the cracking device 100 also provides the plurality of sets of input data DI for the encrypting device 10 to detect a plurality of sets of leakage data DO generated by the encrypting device 10 based on the input data DI and the secret key SK (Step S25). For the sake of properly comparing the plurality of sets of simulation data with the plurality of sets of leakage data DO, the cracking device 100 performs the mathematical calculation, which is identical to that performed on the leakage model, on the sets of leakage data DO, which have been measured, to generate the calculated data (Step S26). According to an embodiment of the invention, the influence of the second variable only related to the secret key SK can be eliminated by performing the identical mathematical calculation on the plurality of sets of leakage data DO, and the measurement noise can be lowered as well.

Then, the cracking device 100 determines the correlation between each set of simulation data and the calculated data (Step S27). According to an embodiment of the invention, the cracking device 100 calculates the correlation coefficient between each set of simulation data and the calculated data to determine the correlation between each set of simulation data and the calculated data.

In addition, the cracking device 100 obtains the secret key SK used by the encrypting device 10 according to the correlation between the plurality of sets of simulation data and the calculated data (Step S28). According to an embodiment of the invention, when one of the sets of simulation data has the highest correlation coefficient, which means the set of simulation data is the closest to the calculated data, the set of hypothesized keys corresponding to the set of simulation data should be the closest to the secret key SK used by the encrypting device 10.

According to another embodiment of the invention, the cracking device 100 may hypothesize each part of the secret key SK and may generate a plurality of hypothesized keys for each part. When the cracking device 100 determines that some sets of hypothesized keys are consistent with the respective parts of the secret key SK, the cracking device 100 combines the hypothesized keys, which are consistent with the respective parts of the secret key SK, to obtain the secret key SK.

For example, the cracking device 100 divides the secret key SK into the first part and the second part, and hypothesizes the first part to generate a plurality of sets of first hypothesized keys. When determining that the first part is consistent with one of the first hypothesized keys, the cracking device 100 hypothesizes the second part to generate a plurality of sets of second hypothesized keys. When determining that the second part is consistent with one of the second hypothesized keys, the cracking device 100 combines the first part and the second part to obtain the secret key SK.

Figure 3:
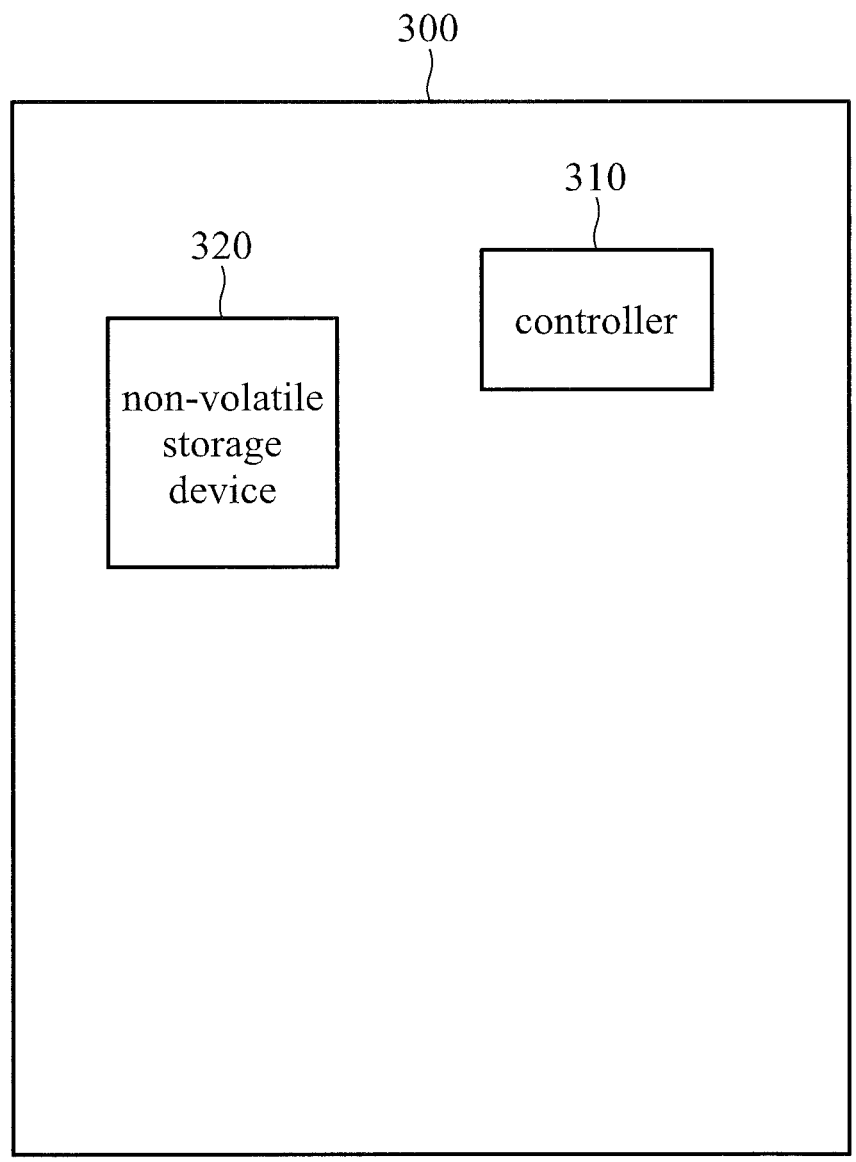
FIG. 3 is a block diagram of a cracking device in accordance with an embodiment of the invention.

FIG. 3 is a block diagram of a cracking device in accordance with an embodiment of the invention. The cracking device 300 in FIG. 3 corresponds to the cracking device 100 in FIG. 1. As shown in FIG. 3, the cracking device 300 includes the controller 310 and the non-volatile storage device 320, in which the non-volatile storage device 320 is configured to store a plurality of instructions. After the controller 310 executes the plurality of instructions stored in the non-volatile storage device 320, the controller 310 executes the respective steps of the cracking method in FIG. 2.

Since the cracking device and the cracking method provided herein are configured to perform a mathematical calculation on the leakage model and a plurality of calculation data, not only is the complexity of data reduced, but the algorithm noise and the measurement noise are also effectively reduced. According to an embodiment of the invention, the mathematical calculation that is performed on the leakage model and the calculation data may be configured to obtain a difference value between two different sets of input data. If necessary, the cracking device and the cracking method provided herein may also include other operations or other calculations, such as obtaining additional input data for eliminating the influence of the second variable related to the secret key.

In addition, when providing N sets of input data DI and performing a mathematical calculation on two of the N sets of input data DI, $C_2^N$ sets of calculation data are obtained, such that the amount of calculation data required can be greatly increased by performing the mathematical calculation. Furthermore, it is assumed that the secret key SK is 128 bits, such that the correlation between the calculation data and the simulation data needs to be confirmed $2^{128}$ times using an exhaustive search. However, the cracking device and the cracking method provided herein divide the secret key SK into 128 parts to confirm their respective correlations. That is, when the cracking device 100 divides the secret key SK into 128 parts to confirm their respective correlations, the number of times that the cracking device 100 has to confirm the correlation between the calculated data and the simulation data is reduced to 128, so that the amount of data that should be processed has been greatly reduced, saving data-processing time.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A cracking method for cracking a secret key of an encrypting device, comprising:
    building up a leakage model for the encrypting device;
    performing a mathematical calculation on the leakage model, according to a plurality of sets of input data, to generate a mathematical model;
    generating a plurality of sets of hypothesized keys;
    generating a plurality of sets of simulation data corresponding to the hypothesized keys using the mathematical model;
    providing the input data for the encrypting device and detecting a plurality of sets of leakage data generated by the encrypting device;
    performing the mathematical calculation on the leakage data to generate calculated data;
    determining a correlation between each of the simulation data and the calculated data; and
    determining one of the hypothesized keys to be consistent with the secret key according to the correlation.

2. The cracking method in claim 1, wherein the step of determining one of the hypothesized keys to be consistent with the secret key according to the correlation further comprises:
    calculating a correlation coefficient between each of the simulation data and the calculated data;
    selecting one of the simulation data as target data according to the correlation coefficient, wherein the correlation coefficient of the target data is the highest; and
    determining one of the hypothesized keys corresponding to the target data to be consistent with the secret key.

3. The cracking method in claim 1, wherein the leakage model generates the different leakage data according to a first variable related to the input data, a second variable related to the hypothesized keys, and a third variable related to both the input data and the hypothesized keys, wherein the mathematical calculation is configured to eliminate the influence of the second variable of the leakage model.

4. The cracking method in claim 3, wherein the encrypting device encrypts the input data, according to the secret key, to generate the different leakage data, wherein the mathematical calculation is further configured to eliminate the influence of the second variable of the encrypting device.

5. The cracking method in claim 1, wherein the step of generating the hypothesized keys further comprises:
    dividing the secret key into N parts; and
    hypothesizing each of the N parts of the secret key to generate N times the sets of hypothesized keys;
    wherein after one of the hypothesized keys, which corresponds to a selected one of the N parts of the secret key, is determined to be consistent with the selected one of the N parts of the secret key, another of the N parts of the secret key is then hypothesized.

6. The cracking method in claim 5, wherein the step of determining one of the hypothesized keys to be consistent with the secret key further comprises:
    determining one of the hypothesized keys corresponding to each of the N parts to be consistent with each of the N parts of the secret key; and
    combining all the N hypothesized keys to obtain the secret key.

7. A cracking device for cracking a secret key of an encrypting device, comprising:
    a controller; and
    a non-volatile storage device, configured to store a plurality of instructions, wherein the controller executes the respective steps according to the instructions, wherein the steps comprise:
    building up a leakage model for the encrypting device;
    performing a mathematical calculation on the leakage model, according to a plurality of sets of input data, to generate a mathematical model;
    generating a plurality of sets of hypothesized keys;
    generating a plurality of sets of simulation data corresponding to the hypothesized keys using the mathematical model;
    providing the input data for the encrypting device and detecting a plurality of sets of leakage data generated by the encrypting device;
    performing the mathematical calculation on the leakage data to generate calculated data; and
    determining one of the hypothesized keys to be consistent with the secret key according to a correlation between each of the simulation data and the calculated data.

8. The cracking device in claim 7, wherein the step of determining one of the hypothesized keys to be consistent with the secret key further comprises:
    calculating a correlation coefficient between each of the simulation data and the calculated data;
    selecting one of the simulation data as target data according to the correlation coefficient, wherein the correlation coefficient of the target data is the highest; and
    determining the hypothesized keys corresponding to the target data to be consistent with the secret key.

9. The cracking device in claim 7, wherein the leakage model generates the different leakage data according to a first variable related to the input data, a second variable related to the hypothesized keys, and a third variable related to both the input data and the hypothesized keys, wherein the mathematical calculation is configured to eliminate the influence of the second variable of the leakage model.

10. The cracking device in claim 9, wherein the encrypting device encrypts the input data, according to the secret key, to generate the different leakage data, wherein the mathematical calculation is further configured to eliminate the influence of the second variable of the encrypting device.

11. The cracking device in claim 7, wherein the step of generating the hypothesized keys further comprises:
    dividing the secret key into N parts; and
    hypothesizing each of the N parts of the secret key to generate N times the sets of hypothesized keys;
    wherein after one of the hypothesized keys, which corresponds to a selected one of the N parts of the secret key, is determined to be consistent with the selected one of the N parts of the secret key, another of the N parts of the secret key is then hypothesized.

12. The cracking device in claim 11, wherein the step of determining one of the hypothesized keys to be consistent with the secret key further comprises:

determining one of the hypothesized keys corresponding to each of the N parts to be consistent with each of the N parts of the secret key; and combining all the N hypothesized keys to obtain the secret key.

\* \* \* \* \*